(12) United States Patent
Sörvik

(10) Patent No.: US 12,408,600 B2
(45) Date of Patent: Sep. 9, 2025

(54) LOG MARKING DEVICE WITH A SETTING UNIT FOR THE STRIKING HEAD

(71) Applicant: Bengt Sörvik, Uppsala (SE)

(72) Inventor: Bengt Sörvik, Uppsala (SE)

( * ) Notice: Subject to any disclaimer, the term of this patent is extended or adjusted under 35 U.S.C. 154(b) by 268 days.

(21) Appl. No.: 18/010,140

(22) PCT Filed: Jun. 14, 2021

(86) PCT No.: PCT/SE2021/050571
§ 371 (c)(1),
(2) Date: Dec. 13, 2022

(87) PCT Pub. No.: WO2021/256974
PCT Pub. Date: Dec. 23, 2021

(65) Prior Publication Data
US 2023/0337603 A1      Oct. 26, 2023

(30) Foreign Application Priority Data
Jun. 15, 2020   (SE) .................................. 2050719-0

(51) Int. Cl.
*A01G 23/099*   (2006.01)
*A01G 23/08*    (2006.01)

(52) U.S. Cl.
CPC .................. *A01G 23/099* (2013.01)

(58) Field of Classification Search
CPC ....... A01G 23/099; A01G 23/08; A01G 23/00
See application file for complete search history.

(56) References Cited

U.S. PATENT DOCUMENTS

| | | | |
|---|---|---|---|
| 7,080,577 B2 | 7/2006 | Latschbacher et al. | |
| 8,511,570 B2 * | 8/2013 | Hakli | G06K 19/04 235/375 |
| 2005/0274229 A1 * | 12/2005 | Latschbacher | G09F 3/12 81/23 |
| 2011/0304513 A1 * | 12/2011 | HaKli | G06K 19/07758 343/702 |

FOREIGN PATENT DOCUMENTS

| | | | |
|---|---|---|---|
| CA | 3067359 A1 * | 1/2019 | ............ A01G 23/08 |
| EP | 0578281 A1 | 1/1994 | |
| SE | 1751221 A1 | 1/2019 | |
| WO | 99/23873 A1 | 5/1999 | |
| WO | 2009/151374 A1 | 12/2009 | |
| WO | 2011/087405 A1 | 7/2011 | |
| WO | 2011/159226 A1 | 12/2011 | |
| WO | 2019/009783 A1 | 1/2019 | |

* cited by examiner

*Primary Examiner* — Mohammed S. Alawadi
(74) *Attorney, Agent, or Firm* — Dilworth & Barrese, LLP

(57) ABSTRACT

A log marking device (1) comprising a log marking tool (2) with a striking head (10) provided with adjustable marking members, and a setting unit (3) with setting members for setting the marking members in desired positions or states. The setting unit also comprises: —a housing (30) with a seat (31) for receiving the striking head; —actuators for controlling the movements of the setting members; and—an electronic control unit for controlling the actuators. The striking head (10) is moveable into a setting position, in which the striking head is received in the seat (31) of the setting unit with each marking member in contact with the associated setting member so as to allow the setting unit (3) to set the positions or states of the marking members by operation of the actuators.

20 Claims, 6 Drawing Sheets

LOG MARKING DEVICE WITH A SETTING UNIT FOR THE STRIKING HEAD

FIELD OF THE INVENTION AND PRIOR ART

The present invention relates to a log marking device according to the preamble of claim 1 for applying a marking on a log.

From WO 99/23873 A1 is previously known a system enabling a rational forest harvesting. According to one aspect of this system, the forest harvesting is carried out by means of a harvesting machine comprising a vehicle and a harvester head mounted thereon, the vehicle being provided with a computer arrangement adapted to register quality and/or size concerning harvested logs. In connection with the felling of a tree, the position of the harvesting machine is determined, for instance by means of a GPS equipment, and a log obtained from the tree is marked by a log marking device with a code by means of which the log is associable to the position information. The code applied on a log may be stored in a database associated with data concerning quality and/or size of the log in question. In this way, it will be possible to treat the logs as products having an identity of origin and it will thereby be possible to check that an individual log or a batch of logs is not originating from a nature reserve where felling of trees is prohibited.

A similar solution that can be used for handling logs emanating from trees which have not been felled by means of a harvesting machine equipped with a log marking device is disclosed in WO 2019/009783 A1. In the solution according to WO 2019/009783 A1, the logs are marked with a code by means of a hand-held log marking tool in the form of a hammer, which comprises a striking head provided with adjustable marking members that are configured to leave a marking on a log when the striking head is hit against it. Each adjustable marking member included in the log marking tool disclosed in WO 2019/009783 A1 is rotatable and provided with a marking element, which is configured to leave a rotationally unsymmetrical mark on a log when the striking head is hit against it and which is settable in different rotational positions by rotation of the associated marking member. Variable and unique code markings may thereby be achieved on logs by means of the marking members included in this previously known log marking tool.

It is also previously known to mark individual logs with transponders (see for instance U.S. Pat. No. 8,511,570 B2) or marker tags (see for instance U.S. Pat. No. 7,080,577 B2) which are attached to the logs by means of a hand-held striking tool.

SUMMARY OF THE INVENTION

The object of the present invention is to provide a log marking device of new and favourable design for applying a marking on a log, for instance on the end surface of a log.

According to the invention, this object is achieved by means of a log marking device having the features defined herein.

The log marking device according to the present invention comprises:
- a log marking tool with a striking head, wherein the striking head is provided with several adjustable marking members that are configured to leave a marking on a log when the striking head is hit against it; and
- a setting unit, by means of which said marking members are shiftable between different positions or states so as to allow a variation of the marking to be applied by the log marking device, wherein the setting unit comprises:
  - a housing,
  - a seat arranged in the housing and configured to receive the striking head,
  - setting members, which are moveably arranged in the housing and connectable to a respective one of the marking members,
  - actuators, which are mounted to the housing and configured to control the movement of a respective one of the setting members in relation to the housing, and
  - an electronic control unit for controlling the actuators.

According to the invention, the log marking tool is moveable in relation to the setting unit in order to allow the striking head to be moved between a released position, in which the striking head is disengaged from the setting unit and operable to be hit against a log in order to apply a marking on it by means of the marking members, and a setting position, in which the striking head is received in the seat of the setting unit with each marking member in contact with the associated setting member so as to allow the setting unit to set the positions or states of the marking members by operation of the actuators.

By means of the setting unit, the marking members of the striking head can be automatically set in the positions or states required for achieving a desired code marking on a log to be marked. The code marking to be applied by means of the marking members can easily be changed by positioning the striking head in the associated seat in the setting unit in order to allow the setting unit to change the positions or states of the marking members. In the log marking device of the present invention, the electronics and other sensitive components used for setting the positions or states of the marking members of the striking head are mounted in the setting unit and are consequently separated from the striking head and thereby protected from being damaged by impacts caused when the striking head is hit against a log to be marked.

According to an embodiment of the invention, the striking head and the setting unit are provided with mutually co-operating guide members, which are configured to guide the striking head into the setting position when the striking head is moved in relation to the setting unit from the released position to the setting position. The guide members will ensure that the striking head is correctly positioned in the seat of the setting unit when the positions or states of the marking members are to be adjusted in order to change the code marking to be applied by the log marking tool. Said guide members preferably comprise two protruding guide members arranged on opposite sides of the striking head and two guide tracks arranged opposite each other in the seat, wherein the protruding guide members are configured to be received in and moveable along a respective one of the guide tracks when the striking head is moved in relation to the setting unit from the released position to the setting position.

According to another embodiment of the invention, the actuators have the form of electric motors, preferably DC motors. In this case, each setting member may be connected to an output shaft of the associated actuator, either directly or via a suitable gear. Hereby, the individual movements of the setting members, and thereby the desired adjustment of the marking members, may be achieved in a simple and reliable manner.

Another embodiment of the invention is characterized in:
- that each marking member is rotatably mounted in a housing of the striking head and comprises a marking element, which is configured to leave a rotationally unsymmetrical mark on a log when the striking head is hit against it and which is settable in different rotational positions by rotation of the associated marking member; and that the setting members are rotatably arranged in the housing of the setting unit and rotatable in relation to this housing by means of the actuators in order to allow the setting unit to set the rotary positions of the marking members, and thereby the rotary positions of the marking elements, by rotation of the setting members under the effect of the actuators.

The use of marking elements of the above-mentioned type offers a great variability of the code marking that can be applied by the log marking tool.

According to another embodiment of the invention, the setting unit comprises sensors, preferably in the form of inductive sensors, for detecting the rotary positions of the setting members in relation to the housing of the setting unit, wherein the electronic control unit is connected to the sensors in order to receive measuring values from the sensors as to the rotary position of each setting member in relation to the housing of the setting unit. Hereby, it will be possible to make sure that the marking members are set in the correct and desired positions by the setting members.

Another embodiment of the invention is characterized in:
that the striking head is provided with a locking mechanism for locking the marking members in the rotary positions set by means of the setting unit, wherein the locking mechanism comprises a locking member, which is moveable between a locking position, in which the locking member is configured to engage with the marking members and prevent them from rotating, and an unlocking position, in which the locking member is configured to allow rotation of the marking members; and that the locking mechanism comprises a manoeuvring member, which is configured to automatically move the locking member from the locking position to the unlocking position when the striking head is moved into the setting position.

The locking member will ensure that the marking members remain in the set rotary positions between the setting operations.

Another embodiment of the invention is characterized in:
that the manoeuvring member is accessible on the outside of the striking head and moveable from an advanced position to a retracted position against the action of a spring force from one or more spring members arranged in the striking head, wherein the manoeuvring member, when moved from the advanced position to the retracted position, is configured to effect a movement of the locking member from the locking position to the unlocking position;

that the locking member is moveable from the unlocking position to the locking position under the effect of said spring force; and that the manoeuvring member is configured to be moved from the advanced position to the retracted position by being pressed against a contact surface in the seat of the setting unit when the striking head is moved into the setting position.

Thus, the manoeuvring member is automatically moved from the advanced position to the retracted position, and the marking members are thereby released for rotation, when the striking head is moved into the setting position in the seat of the setting unit.

Another embodiment of the invention is characterized in:
that each setting member comprises:
a rotatable base part, which is rotatable in relation to the housing of the setting unit by the actuator associated with the setting member, and
a first coupling element, which is non-rotatably connected to the base part so as to be rotatable together with the base part and which is engageable with a corresponding second coupling element on the associated marking member when the striking head is in the setting position, wherein the first and second coupling elements, when they are in engagement with each other, are configured to transmit torque from the base part of the setting member to the associated marking member in connection with a rotation of the setting member; and that one of said first and second coupling elements has the form of a male-shaped coupling element and the other one of said first and second coupling elements has the form of a female-shaped coupling element.

The male-shaped and female-shaped first and second coupling elements will ensure a reliable torque transmitting connection between the setting members and the marking members during the adjustment of the rotary positions of the marking members under the effect of the setting unit.

According to another embodiment of the invention, said first coupling element is axially moveable in relation to the associated base part from an advanced position to a retracted position against the action of a spring force from one or more spring members included in the setting unit and from the retracted position to the advanced position under the effect of this spring force. Thus, the first coupling elements are spring-loaded towards the advanced position. If any one of the first coupling elements is not correctly aligned with the associated second coupling element when the striking head has been moved into the setting position in the seat of the setting unit, the first coupling element will be pressed into the retracted position by the second coupling element against the action of said spring force. The first coupling element may thereafter be rotated under the effect of the associated actuator, and when the first coupling element reaches a rotary position in alignment with the associated second coupling element it will be pushed forwards under the effect of said spring force into engagement with the second coupling element. Hereby, it will be possible, in a simple and reliable manner, to bring the first and second coupling elements of each pair of coupling elements into proper engagement with each other also in a situation when the coupling elements included in one or more of said pairs are not properly aligned with each other at the moment when the striking head reaches the setting position.

Another embodiment of the invention is characterized in:
that each marking member comprises an elongated shaft, which is rotatably arranged in the housing of the striking head and extends across the striking head from a front side of the striking head to an opposite rear side thereof, wherein the shaft has a first end located at the front side of the striking head and an opposite second end located at the rear side of the striking head;

that each marking element is non-rotatably fixed to the shaft of the associated marking member at the first end of the shaft so as to be rotatable in relation to the housing of the striking head together with the shaft; and that each second coupling element is non-rotatably fixed to the shaft of the associated marking member at the second end of the shaft so as to be rotatable in relation to the housing of the striking head together with the shaft.

In this case, the rotary positions of the marking elements on the front side of the striking head are adjusted by rotating the second coupling elements on the rear side of the striking head. However, the second coupling elements may as an alternative be arranged on the front side of the striking head, for instance with each second coupling element arranged radially outside the marking element of the associated marking member. As a further alternative, the marking elements may be configured for direct engagement with the first coupling elements. Thus, in the latter case, the second coupling elements are formed by the marking elements.

According to another embodiment of the invention, the log marking tool has the form of a portable, hand-held hammer, wherein the striking head of the log marking tool is fixed to a handle included in the log marking tool. However, the log marking device of the present invention may as an alternative be used in a harvester head for tree harvesting. In the latter case, the striking head is arranged at the outer end of a pivotally mounted striking arm, which is pivotable about an axis of rotation under the effect of an actuating member to thereby allow the striking head to hit against the end surface of a crosscut end of a tree trunk held by the gripping members of the harvester head in order to apply a marking on said end surface.

Further advantageous features of the log marking device of the present invention will appear from the description following below.

BRIEF DESCRIPTION OF THE DRAWINGS

With reference to the appended drawings, a specific description of embodiments of the invention cited as examples follows below.

In the drawings.

DETAILED DESCRIPTION OF EMBODIMENTS OF THE INVENTION

Figure 1:
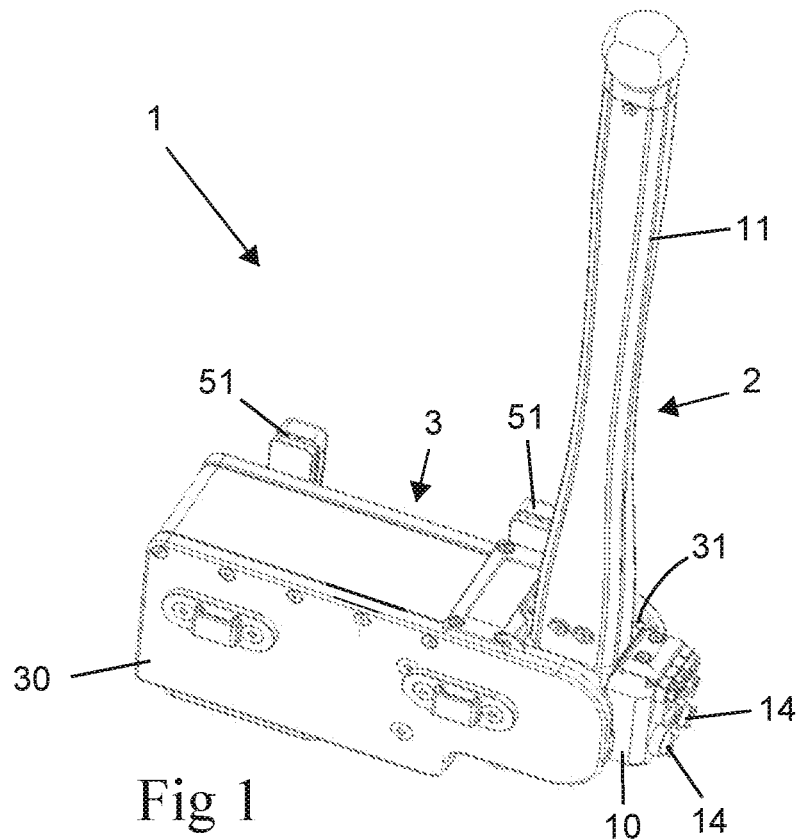
FIG. 1 is a perspective view of a log marking tool and a setting unit included in a log marking device according to an embodiment of the present invention, as seen with the striking head of the log marking tool in the setting position.

A log marking device 1 according to an embodiment of the present invention is illustrated in FIG. 1. The log marking device 1 comprises a log marking tool 2 and a setting unit 3. The log marking tool 2 is to be used for applying a unique code marking on a log, preferably on a surface at a crosscut end of the log.

The log marking tool 2 preferably has a unique identity in order to make it possible to distinguish different log marking tools from each other. The unique identity of the log marking tool 2 is for instance indicated in the form of an item number on the log marking tool.

The log marking tool 2 comprises a striking head 10, which is provided with several adjustable marking members 12 that are configured to leave a marking on a log, for instance by stamping or punching, when the striking head 10 is hit against the log. The marking members 12 are shiftable between different positions or states under the effect of the setting unit 3 in order to allow a variation of the code marking to be applied by the log marking tool 2.

In the illustrated embodiment, the log marking tool 2 has the form of a portable, hand-held hammer. In this case, the log marking tool 2 comprises a handle 11, wherein the striking head 10 is fixed to the handle 11 at one end thereof and is to be hit against a log by a person gripping the handle 11 with one hand or two hands, in order to apply a code marking on the log.

Figure 11:
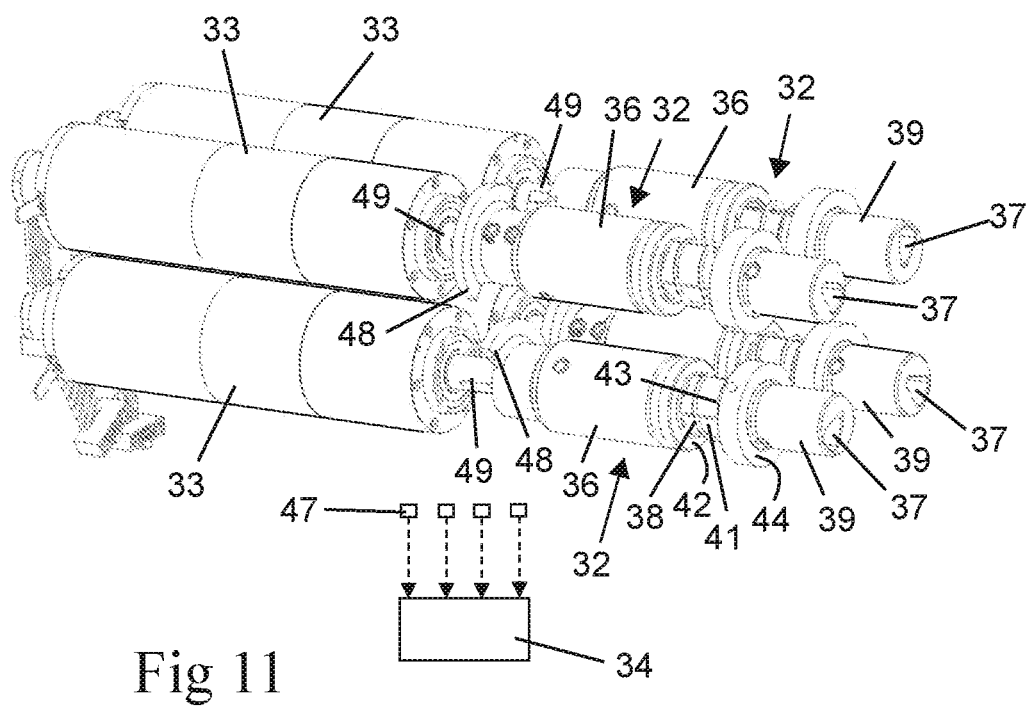
FIG. 11 is a schematic illustration of parts included in the setting unit shown in FIGS. 8 and 9.
Figure 12:
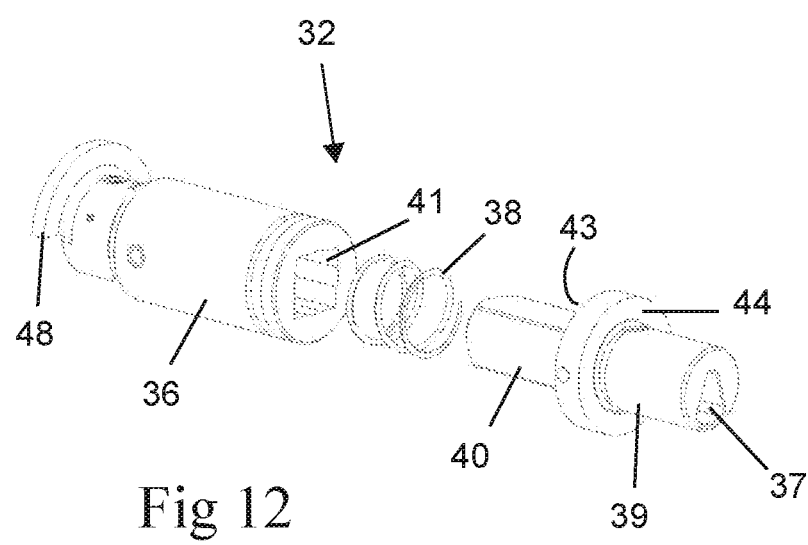
FIG. 12 is a perspective view of a setting member included in the setting unit shown in FIGS. 8 and 9.

The setting unit 3 comprises a housing 30. A seat 31 for the striking head 10 is provided in the housing 30. Setting members 32 (see FIGS. 10-12) are moveably arranged in the housing 30, wherein these setting members 32 are moveable in relation to the housing 30 by means of actuators 33 arranged in or mounted on the housing. Each setting member 32 is connected to its own actuator 33, which is configured to control the movement of the associated setting member 32 in relation to the housing 30. The setting members 32 are to be connected to a respective one of the marking members 12 in the striking head 10 when the striking head is received in the seat 31 to thereby allow the setting unit 3 to set the marking members 12 in desired positions or states by movement of the setting members 32 under the effect of the actuators 33. The actuators 33 are controlled by means of an electronic control unit 34 (very schematically illustrated in FIG. 11), which may be arranged in the housing 30 of the setting unit 3.

Figure 2:
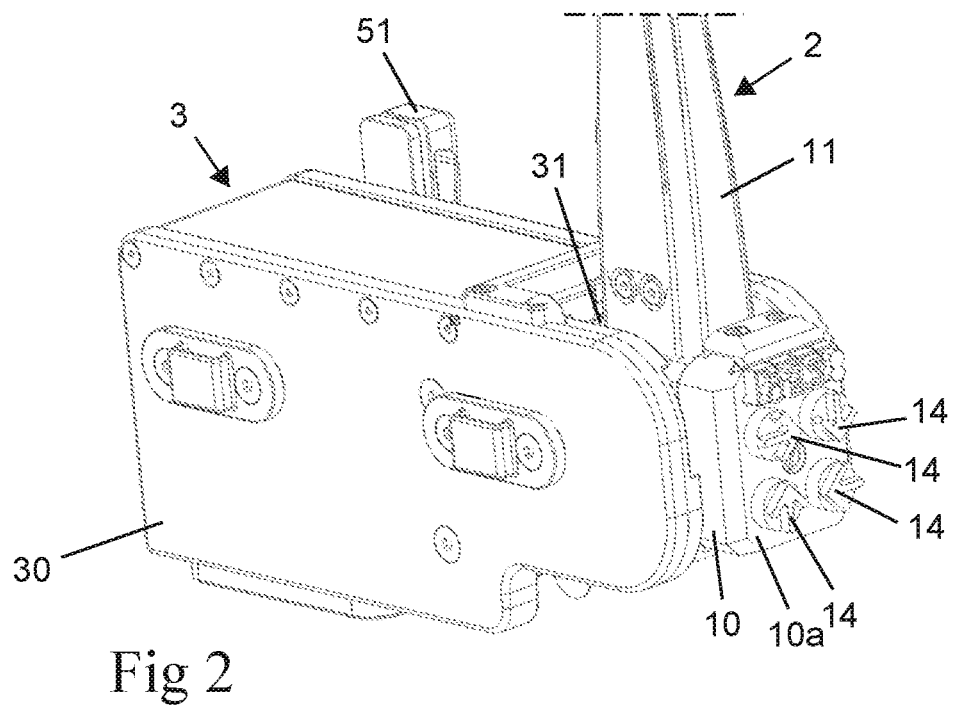
FIG. 2 is a perspective view of the setting unit and a part of the log marking tool of FIG. 1, as seen with the striking head of the log marking tool in the setting position.
Figure 3:
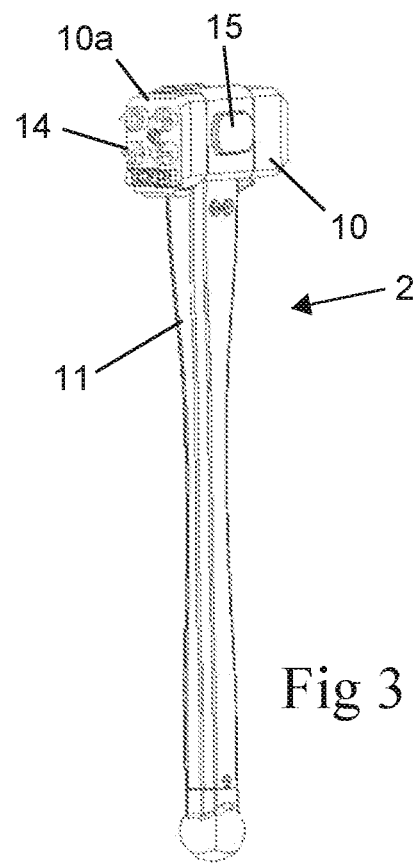
FIG. 3 is a perspective view of the log marking tool shown in FIG. 1.

The log marking tool 2 is moveable in relation to the setting unit 3 in order to allow the striking head 10 to be moved between a released position (see FIG. 3), in which the striking head 10 is disengaged from the setting unit 3 and operable to be hit against a log in order to apply a marking on it by means of the marking members 12, and a setting position (see FIGS. 1 and 2), in which the striking head 10 is received in the seat 31 of the setting unit 3 with each marking member 12 in contact with the associated setting member 32 in order to allow the setting unit 3 to set the positions or states of the marking members 12 by operation of the actuators 33.

The striking head 10 and the setting unit 3 are with advantage provided with mutually co-operating guide members 15, 35, which are configured to guide the striking head 10 into the setting position when the striking head is moved in relation to the setting unit 3 from the released position to the setting position. In the illustrated embodiment, these guide members comprise two protruding guide members 15 arranged on opposite sides of the striking head 10 and two guide tracks 35 arranged opposite each other in the seat 31. The protruding guide members 15 are configured to be received in and moveable along a respective one of the guide tracks 35 when the striking head 10 is moved in relation to the setting unit 3 from the released position to the setting position.

In the illustrated embodiment, each marking member 12 is rotatably mounted in a housing 13 of the striking head 10 and comprises a marking element 14, which is configured to leave a rotationally unsymmetrical mark on a log when the striking head 10 is hit against it and which is settable in different rotational positions by rotation of the associated marking member 12. In this case, the setting members 32 are rotatably arranged in the housing 30 of the setting unit 3 and rotatable in relation to this housing 30 by means of the actuators 33 in order to allow the setting unit 3 to set the rotary positions of the marking members 12, and thereby the rotary positions of the marking elements 14, by rotation of the setting members 32 under the effect of the actuators 33 and thereby allow a unique code marking of a desired configuration to be achieved by means of the marking elements 14.

In the illustrated embodiment, each marking element 14 is configured to apply an arrow-shaped mark on a log. The marking elements 14 may of course also have any other suitable shape in order to form a rotationally unsymmetrical mark of a desired shape on a log. The illustrated marking elements 14 are configured to apply a mark on a log by stamping or punching. Thus, these marking elements 14 are intended to penetrate into the surface of a log hit by the striking head 10 so as to achieve an indentation in said surface.

In the illustrated embodiment, the striking head 10 is provided with four marking member 12. However, the striking head 10 may be provided with any suitable number of marking members 12.

In the illustrated embodiment, each setting member 32 comprises:
- a rotatable base part 36, which is rotatable in relation to the housing 30 of the setting unit 3 by the actuator 33 associated with the setting member 32; and
- a first coupling element 37, which is non-rotatably connected to the base part 36 so as to be rotatable together with the base part and which is engageable with a corresponding second coupling element 17 on the associated marking member 12 when the striking head 10 is in the setting position.

The above-mentioned second coupling element 17 is non-rotatably fixed to the associated marking member 12. When the first and second coupling elements 37, 17 are in engagement with each other and the base part 36 of the setting member 32 is rotated by the associated actuator 33, torque is transmitted from the base part 36 of the setting member 32 to the associated marking member 12 via the coupling elements 37, 17 and a rotation of the marking member 12 is thereby achieved. In the illustrated example, the first coupling elements 37 have the form of female-shaped coupling elements and the second coupling elements 17 have the form of corresponding male-shaped coupling elements. As an alternative, the first coupling elements 37 may have the form of male-shaped coupling elements, wherein the second coupling elements 17 have the form of corresponding female-shaped coupling elements.

Figure 10:
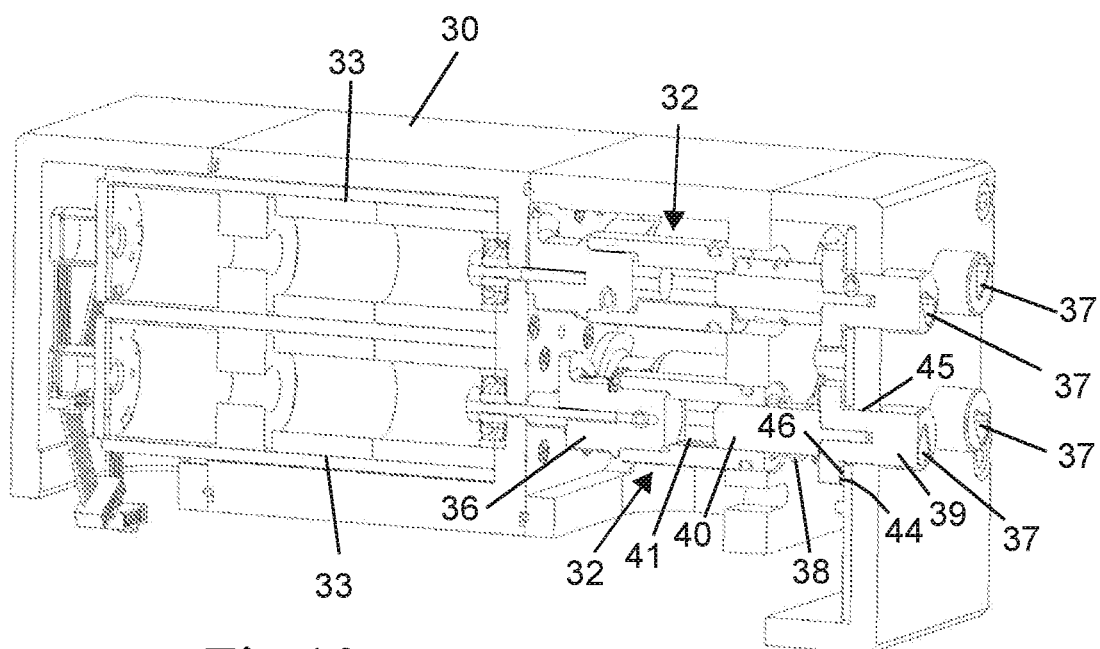
FIG. 10 is a schematic and cut perspective view of parts included in the setting unit shown in FIGS. 8 and 9.

In the illustrated embodiment, the first coupling element 37 of each setting member 32 is axially moveable in relation to the base part 36 of the setting member from an advanced position to a retracted position against the action of a spring force from at least one spring member 38 and from the retracted position to the advanced position under the effect of the spring force from this spring member 38. In the illustrated example, each setting member 32 comprises a slide element 39, which at a rear end is provided with a pin-shaped slide part 40 and which at a front end carries the first coupling element 37. The slide part 40 of the slide element 39 is slidably and non-rotatably received in a corresponding recess 41 in the base part 36 of the setting member 32 in order to allow the slide element 39 to slide axially in relation to the base part 36 and prevent the slide element 39 from rotating in relation to the base part 36. In the illustrated example, the slide part 40 and the recess 41 have corresponding polygonal cross-sectional shapes in order to prevent mutual rotation between the slide element 39 and the base part 36, but they could also have any other suitable cross-sectional shapes as long as such a mutual rotation is prevented. In the example illustrated in FIGS. 10-12, each setting member 32 comprises a spring member 38 in the form of a coil spring, which surrounds the slide part 40 of the slide element 39 and which at a first end abuts against a front face 42 on the base part 36 and at an opposite second end abuts against a rearwardly facing shoulder 43 on the slide element 39. Each slide element 39 extends through an aperture 45 in the housing 30 of the setting unit 3, as illustrated in FIG. 10, and a forwardly facing shoulder 44 on the slide element 39 is urged by the associated spring member 38 against a stop surface 46 on the inner side of the housing 30.

The setting members 32 may of course also have any other suitable design.

The setting unit 3 is preferably provided with sensors 47 (very schematically illustrated in FIG. 11) for detecting the rotary positions of the setting members 32 in relation to the housing 30 of the setting unit. The electronic control unit 34 is connected to these sensors 47 in order to receive measuring values from the sensors as to the rotary position of each setting member 32 in relation to the housing 30 of the setting unit. In the illustrated embodiment, the sensors 47 have the form of inductive sensors, which are configured to detect the positions of cam elements 48 arranged on the periphery of the base parts 36 of the setting members 32.

In the illustrated embodiment, the actuators 33 have the form of electric motors, preferably DC motors, wherein the base part 36 of each setting member 32 is non-rotatably connected to an output shaft 49 of the associated actuator 33 in order rotate together with this output shaft. The internal parts of the actuators 33 have been omitted in FIG. 10.

Electric current is supplied to the actuators 33 and to the electronic control unit 34 from a power source, which may be an external power source or a power supply unit mounted to the housing 30 of the setting unit 3. The power supply unit comprises at least one energy storage member, for instance in the form of a battery, for storing electric energy.

In the illustrated embodiment, each marking member 12 comprises an elongated shaft 18, which is rotatably mounted in the housing 13 of the striking head 10 and extends axially across the striking head from a front side 10a of the striking head to an opposite rear side 10b thereof. The shaft 18 has a first end 18a located at the front side 10a of the striking head and an opposite second end 18b located at the rear side 10b of the striking head. Each marking element 14 is non-rotatably fixed to the shaft 18 of the associated marking member 12 at the first end 18a of the shaft so as to be rotatable in relation to the housing 13 of the striking head 10 together with the shaft 18. Each second coupling element 17 is non-rotatably fixed to the shaft 18 of the associated marking member 12 at the second end 18b of the shaft so as to be rotatable in relation to the housing 13 of the striking head 10 together with the shaft 18.

The marking members 12 may of course also have any other suitable design.

The striking head 10 is with advantage provided with a locking mechanism 20 for locking the marking members 12 in the rotary positions set by means of the setting unit 3. The locking mechanism 20 comprises a locking member 21, which is moveable between a locking position, in which the locking member 21 is in engagement with the marking members 12 and prevents them from rotating, and an unlocking position, in which the locking member 21 allows rotation of the marking members 12. In the illustrated example, the locking member 21 is slidably mounted inside the housing 13 of the striking head 10 and provided with locking teeth 22, which are configured to come into engagement with toothed rings 23 on the marking members 12 when the locking member 21 is moved from the unlocking position to the locking position and thereby prevent rotation of the marking members 12. Each toothed ring 23 is non-rotatably fixed to the shaft 18 of the associated marking member 12 so as to be rotated together with the shaft 18 when the shaft is rotated. The locking member 21 is urged towards the locking position under the effect of the spring force from one or more spring members 25 and moveable from the locking position to the unlocking position against the action of this spring force.

Figure 4:
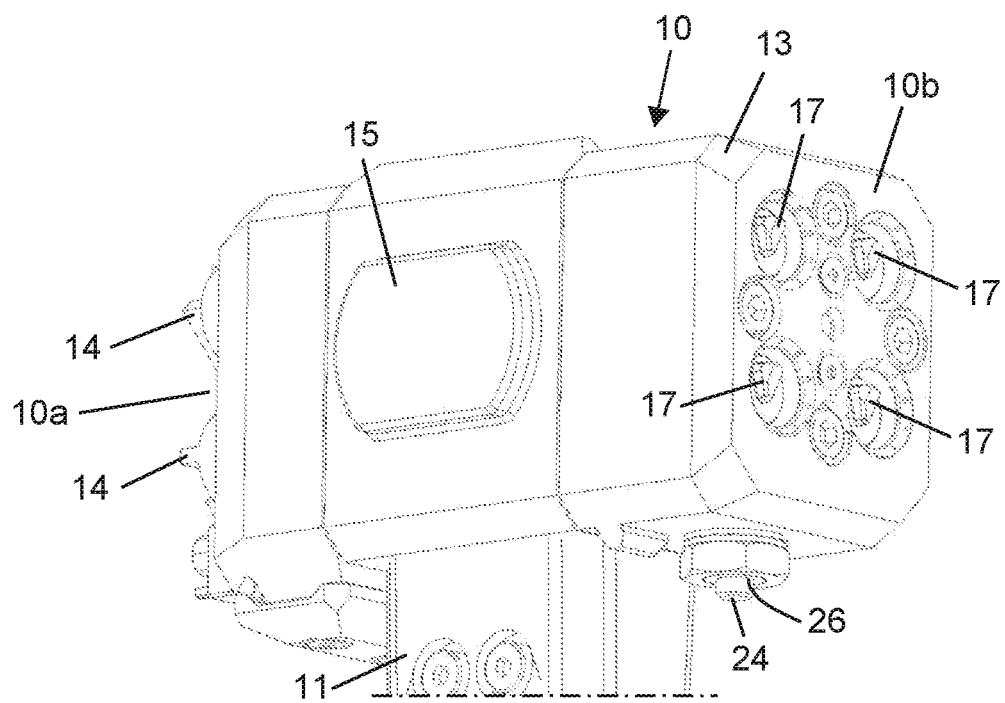
FIG. 4 is a perspective view of the striking head included in the log marking tool shown in FIG. 1.
Figure 5:
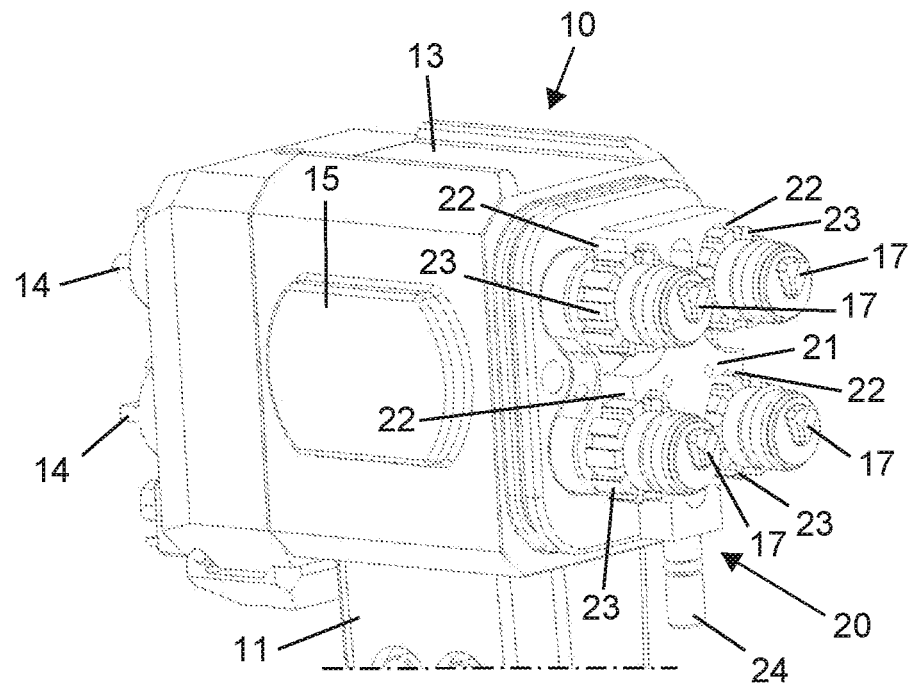
FIG. 5 is a perspective view corresponding to FIG. 4, but with a part of a housing of the striking head removed.
Figure 6:
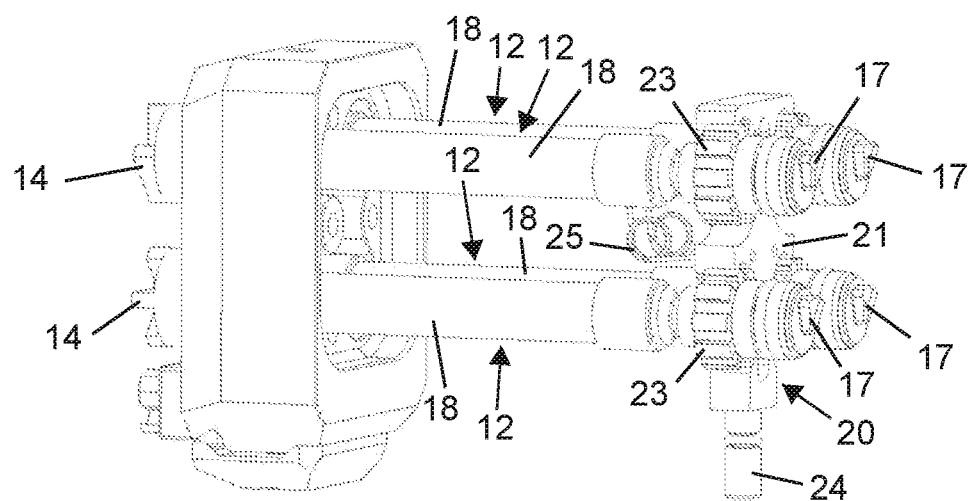
FIG. 6 is a perspective view of parts included in the striking head shown in FIG. 4.
Figure 7:
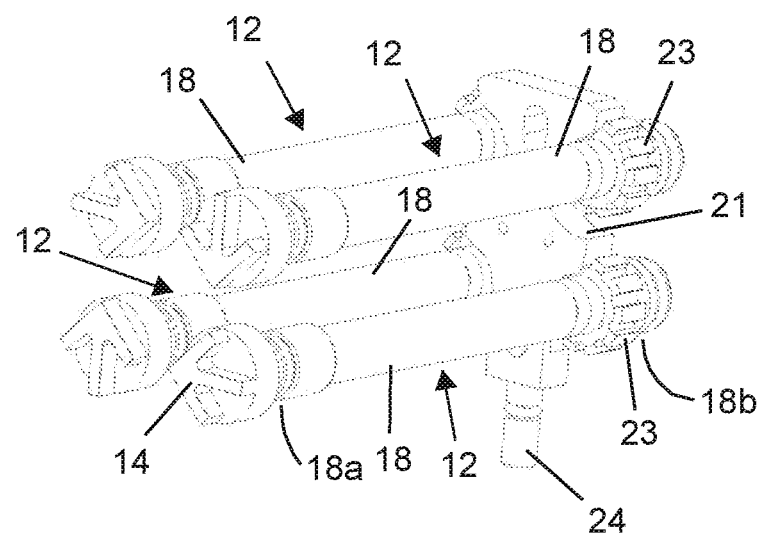
FIG. 7 is another perspective view of parts included in the striking head shown in FIG. 4, FIGS. 8 and 9 are perspective views of the setting unit shown in FIG. 1.
Figure 8:
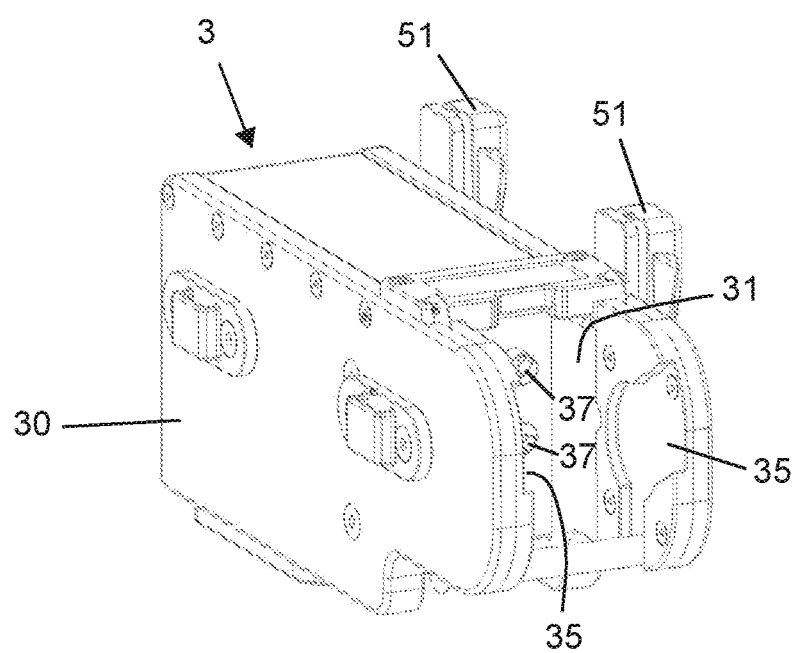
Figure 9:
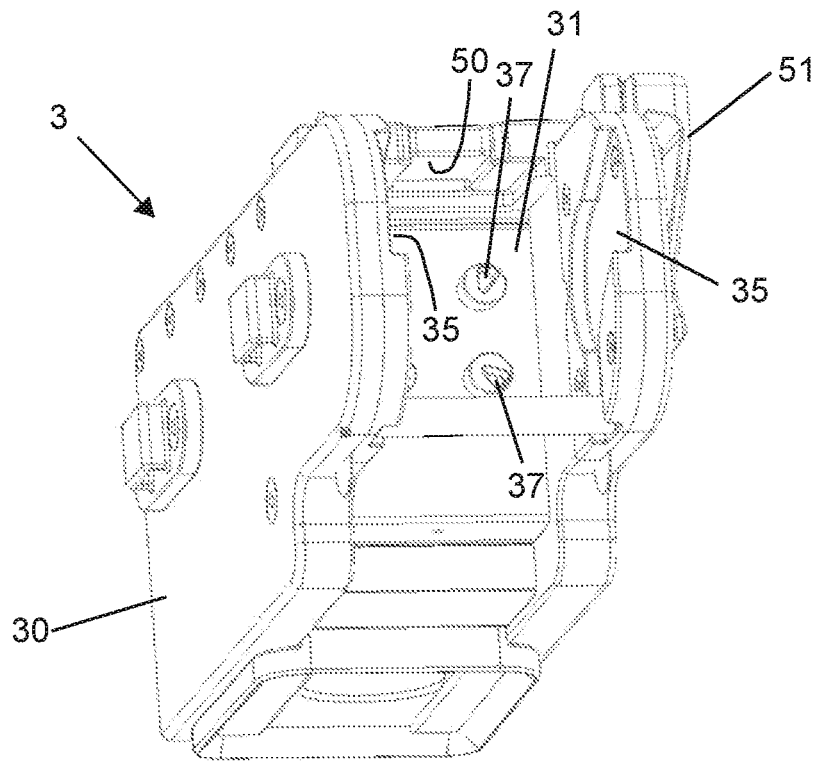

The locking mechanism 20 also comprises a manoeuvring member 24, which is connected to the locking member 21 and configured to automatically move the locking member 21 from the locking position to the unlocking position when the striking head 10 is moved into the setting position in the seat 31 of the setting unit 3. The manoeuvring member 24 is accessible on the outside of the striking head 10 and moveable from an advanced position to a retracted position against the action of the spring force from the above-mentioned spring member or members 25 in the striking head 10. When moved from the advanced position to the retracted position, the manoeuvring member 24 effects a movement of the locking member 21 from the locking position to the unlocking position. In the illustrated embodiment, the manoeuvring member 24 has the form of an elongated pin and extends through an aperture 26 in the housing 13 of the striking head 10, as illustrated in FIG. 4. In this case, the manoeuvring member 24 is moved from the advanced position to the retracted position by being pressed against a contact surface 50 (see FIG. 9) in the seat 31 of the setting unit 3 when the striking head 10 is moved into the setting position. In the illustrated example, the manoeuvring member 24 is rigidly fixed to the locking member 21 and the locking member is thereby moved in relation to the housing 13 of the striking head 10 together with the manoeuvring member 24 when the manoeuvring member is moved from the advanced position to the retracted position.

The locking mechanism 20 may of course also have any other suitable design.

When the rotary positions of the marking elements 14 are to be set by means of the setting unit 3, the protruding guide members 15 on the striking head 10 are moved into the guide tracks 35 in the seat 31 of the setting unit 3, whereupon the striking head 10 is moved into the setting position in the seat 31 while being guided by the guide tracks 35. During the final phase of this movement, the manoeuvring member 24 is pressed against the contact surface 50 in the seat 31 and thereby moved from the advanced position to the retracted position, which will effect a movement of the locking member 21 from the locking position to the unlocking position and thereby release the marking members 12 for rotation in relation to the housing 13 of the striking head 10.

When the striking head 10 reaches the setting position in the seat 31, the marking members 12 are aligned with the setting members 32 and the second coupling elements 17 on the marking members 12 are in contact with the corresponding first coupling elements 37 on the setting members 32. When the striking head 10 has reached the setting position, the electronic control unit 34 will control the actuators 33 to rotate each setting member 32 at least one turn into a predetermined reference position. This rotation of the setting members 32 will make sure that the first coupling element 37 on each setting member 32 will come into alignment with and be engaged with the corresponding second coupling element 17 on the associated marking member 12. Thereafter, the electronic control unit 34 will control the actuators 33 to rotate the setting members 32 into specified rotary positions and thereby effect a setting of the marking elements 12 in the desired rotary positions. The striking head 10 is thereafter released from the setting unit 3, which will release the manoeuvring member 24 from the contact surface 50 in the seat 31, which in its turn will cause a movement of the locking member 21 into the locking position under the effect of the spring force from the spring member or members 25 in the striking head 10 and the locking member 21 will thereby lock the marking members 12 in their prevailing rotary positions.

The marking applied on a log by means of the log marking tool 2 preferably represents a unique code, which can be used to identify the marked log. This code is with advantage electronically retrieved or generated by means of the electronic control unit 34 of the setting unit 3. The code may for instance be electronically retrieved by the electronic control unit 34 from a database comprising a set of predetermined codes, wherein this database is stored on a data storage medium, for instance in the form of a memory accommodated in the housing 30 of the setting unit 3. As an alternative, the code may be electronically generated in a predefined manner by means of the electronic control unit 34. As a further alternative, the code may be electronically retrieved or generated by means of an external electronic processing device, which in its turn is configured to transmit the code to the electronic control unit 34 of the setting unit 3 through a wireless connection.

The prevailing geographical position of the log marking device 1 is preferably established by means of a position determining device (not shown). This position determining device is with advantage configured to operate according to the GPS system (GPS=Global Positioning System). However, any other suitable type of position determining device may also be used. The position determining device is connected to the electronic control unit 34 and the code to be applied by the log marking tool 2 is stored in a database associated to the position information established by the position determining device. The position determining device may be arranged in the setting unit 3. As an alternative, the geographical position of the log marking device 1 may be established by means of an external position determining device, for instance included in a smart phone or other electronic apparatus carried by the person presently using the log marking device 1, wherein position information generated by means of this external position determining device is transmitted to the electronic control unit 34 of the setting unit 3 through a wireless connection.

A unique code is intended to be retrieved of generated when so ordered by the person presently using the log marking device 1, for instance by means of a triggering member in the form of a push-button or the similar arranged on the setting unit 3. The electronic control unit 34 is preferably configured to allow a code to be retrieved or generated only on condition that the electronic control unit 34 is capable of receiving position information from the position determining device as to the prevailing geographical position of the log marking device 1.

The setting unit 3 is with advantage provided with a sensor, preferably in the form of an inductive sensor or other type of proximity sensor, which is configured to detect that the striking head 10 is in the setting position in the seat 31, wherein the electronic control unit 34 is connected to this sensor. The electronic control unit 34 may be configured to automatically start a setting operation, i.e. an operation for setting the marking members 12 in new positions, when the electronic control unit 34 has received information from this sensor that the striking head 10 has assumed the setting position.

When the log marking tool 2 has the form of a portable, hand-held hammer, the setting unit 3 is with advantage carried by the person presently using the log marking tool 2, for instance by being attached to a waist belt or the similar. In the illustrated embodiment, attachments 51 for attaching the setting unit 3 to a waist belt or another type of belt are arranged on the backside of the housing 30 of the setting unit 3.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A log marking device for applying a marking on a log, the log marking device (1) comprising:
   a log marking tool (2) with a striking head (10), wherein the striking head (10) is provided with adjustable marking members (12), the adjustable marking members (12) are configured to leave the marking on the log when the striking head (10) hits against the log, wherein the log marking device (1) further comprises a setting unit (3), by which the marking members (12) are shiftable between different positions or states to allow a variation of the marking to be applied by the log marking device, the setting unit (3) having:
   a housing (30),
   a seat (31) arranged in the housing (30) and configured to receive the striking head (10),
   setting members (32) moveably arranged in the housing (30) and connectable to a respective one of the marking members (12),
   actuators (33) mounted to the housing (30) and configured to control a movement of a respective one of the setting members (32) in relation to the housing (30) and
   an electronic control unit (34) for controlling the actuators (33); and
   the log marking tool (2) is moveable in relation to the setting unit (3) to allow the striking head (10) to be moved between a released position, in which the striking head (10) is disengaged from the setting unit (3) to hit against the log to apply the marking on the log by the marking members (12) when the striking head (10) hits against the log, and a setting position, in which the striking head (10) is received in the seat (31) of the setting unit (3) with each of the marking members (12) in contact with the associated of the setting members (32) to allow the setting unit (3) to set the different positions or states of the marking members (12) by operation of the actuators (33).

2. The log marking device according to claim 1, wherein the striking head (10) and the setting unit (3) are provided with mutually co-operating guide members (15, 35), wherein the guide members (15, 35) are configured to guide the striking head (10) into the setting position when the striking head is moved in relation to the setting unit (3) from the released position to the setting position.

3. The log marking device according to claim 2, wherein said guide members comprise two protruding guide members (15) arranged on opposite sides of the striking head (10) and two guide tracks (35) arranged opposite each other in the seat (31), and
   the protruding guide members (15) are configured to be received in and moveable along a respective one of the guide tracks (35) when the striking head is moved in relation to the setting unit (3) from the released position to the setting position.

4. The log marking device according to claim 3, wherein the actuators (33) have a form of electric motors.

5. The log marking device according to claim 4, wherein each of the setting members (32) is connected to an output shaft (49) of the associated actuator (33).

6. The log marking device according to claim 5,
   wherein each of the marking members (12) is rotatably mounted in a housing (13) of the striking head (10), wherein each marking member (12) comprises a marking element (14) configured to leave a rotationally unsymmetrical mark on the log when the striking head (10) hits against the log and the marking element (14) is settable in different rotational positions by rotation of the associated marking member (12); and
   the setting members (32) are rotatably arranged in the housing (30) of the setting unit (3) to be rotatable in relation to the housing by the actuators (33) to allow the setting unit (3) to set rotary positions of the marking members (12), and thereby the rotary positions of the marking elements (14), by rotation of the setting members (32) under effect of the actuators (33).

7. The log marking device according to claim 4,
   wherein each of the marking members (12) is rotatably mounted in a housing (13) of the striking head (10), wherein each marking member (12) comprises a marking element (14) configured to leave a rotationally unsymmetrical mark on the log when the striking head (10) hits against the log and the marking element (14) is settable in different rotational positions by rotation of the associated marking member (12); and
   the setting members (32) are rotatably arranged in the housing (30) of the setting unit (3) to be rotatable in relation to the housing by the actuators (33) to allow the setting unit (3) to set rotary positions of the marking members (12), and thereby the rotary positions of the marking elements (14), by rotation of the setting members (32) under effect of the actuators (33).

8. The log marking device according to claim 2, wherein the actuators (33) have a form of electric motors.

9. The log marking device according to claim 8, wherein each of the setting members (32) is connected to an output shaft (49) of the associated actuator (33).

10. The log marking device according to claim 9,
    wherein each of the marking members (12) is rotatably mounted in a housing (13) of the striking head (10), wherein each marking member (12) comprises a marking element (14) configured to leave a rotationally unsymmetrical mark on the log when the striking head

(10) hits against the log and which is settable in different rotational positions by rotation of the associated marking member (12); and the setting members (32) are rotatably arranged in the housing (30) of the setting unit (3) to be rotatable in relation to the housing by the actuators (33) to allow the setting unit (3) to set rotary positions of the marking members (12), and thereby the rotary positions of the marking elements (14), by rotation of the setting members (32) under effect of the actuators (33).

11. The log marking device according to claim 1, wherein the actuators (33) have a form of electric motors.

12. The log marking device according to claim 11, wherein each of the setting members (32) is connected to an output shaft (49) of the associated actuator (33).

13. The log marking device according to claim 1,
wherein each of the marking members (12) is rotatably mounted in a housing (13) of the striking head (10), wherein the striking head (10) comprises a marking element (14) configured to leave a rotationally unsymmetrical mark on the log when the striking head (10) hits against the log and the marking element (14) is settable in different rotational positions by rotation of the associated marking member (12); and the setting members (32) are rotatably arranged in the housing (30) of the setting unit (3) to be rotatable in relation to the housing by the actuators (33) to allow the setting unit (3) to set rotary positions of the marking members (12), and thereby the rotary positions of the marking elements (14), by rotation of the setting members (32) under effect of the actuators (33).

14. The log marking device according to claim 13, wherein the setting unit (3) comprises sensors (47), in a form of inductive sensors, for detecting the rotary positions of the setting members (32) in relation to the housing (30) of the setting unit, and the electronic control unit (34) is connected to the sensors (47) to receive measuring values of the rotary positions of the setting members (32) in relation to the housing (30) of the setting unit (3).

15. The log marking device according to claim 13, wherein the striking head (10) is provided with a locking mechanism (20) for locking the marking members (12) in the rotary positions set by means of the setting unit (3), wherein-the locking mechanism (20) comprises a locking member (21), which is moveable between a locking position, in which the locking member (21) is configured to engage with the marking members (12) and prevent a rotation of the marking members (12), and an unlocking position, in which the locking member (21) is configured to allow rotation of the marking members (12); and the locking mechanism (20) comprises a manoeuvring member (24), which is configured to automatically move the locking member (21) from the locking position to the unlocking position when the striking head (10) is moved into the setting position.

16. The log marking device according to claim 15, wherein the manoeuvring member (24) is accessible outside of the striking head (10) and moveable from an advanced position to a retracted position against the action of a spring force from one or more spring members (25) arranged in the striking head (10);

the manoeuvring member (24), when moved from the advanced position to the retracted position, is configured to effect a movement of the locking member (21) from the locking position to the unlocking position; the locking member (21) is moveable from the unlocking position to the locking position under an effect of said spring force; and the maneuvering member (24) is configured to be moved from the advanced position to the retracted position by being pressed against a contact surface (50) in the seat (31) of the setting unit (3) when the striking head (10) is moved into the setting position.

17. The log marking device according to claim 13, wherein each of the setting members (32) comprises: a rotatable base part (36) rotatable in relation to the housing (30) of the setting unit (3) by one of the actuators (33) associated with the respective one of the setting member (32), and a first coupling element (37) is non-rotatably connected to the rotatable base part (36) to be rotatable together with the rotatable base part (36), and the first coupling element (37) is engageable with a corresponding second coupling element (17) on the associated marking member (12) when the striking head (10) is in the setting position; the first coupling element (37) and second coupling element (17), when in engagement with each other, are configured to transmit torque from the rotatable base part (36) of the setting member (32) to the associated marking member (12) in connection with the rotation of the setting member, and one of the first coupling element (37) and second coupling element (17) has a form of a male-shaped coupling element (17) and other one of said first and second coupling elements has a form of a female-shaped coupling element (37).

18. The log marking device according to claim 17, wherein the first coupling element (37) is axially moveable in relation to the associated rotatable base part (36) from an advanced position to a retracted position against action of a spring force from one or more spring members (38) included in the setting unit (3) and from the retracted position to the advanced position under the effect of this spring force.

19. The log marking device according to claim 17,
wherein each of the marking members (12) comprises an elongated shaft (18) is rotatably arranged in the housing (13) of the striking head (10), and elongated shaft (18) extends across the striking head (10) from a front side (10a) of the striking head to an opposite rear side (10b) thereof; the elongated shaft the elongated shaft (18) has a first end (18a) located at the front side (10a) of the striking head and an opposite second end (18b) located at the rear side (10b) of the striking head;

the marking element (14) is non-rotatably fixed to the elongated shaft (18) of the associated marking member (12) at the first end (18a) of the elongated shaft to be rotatable in relation to the housing (13) of the striking head together with the elongated shaft (18); and the second coupling element (17) is non-rotatably fixed to the elongated shaft (18) of the associated marking member (12) at the second end (18b) of the elongated shaft to be rotatable in relation to the housing (13) of the striking head together with the elongated shaft (18).

20. The log marking device according to claim 1, wherein the log marking tool (2) has a form of a portable, hand-held hammer, and the striking head (10) of the log marking tool (2) having a handle (11) is configured to fix to the striking head (10) of the log marking tool (2).

* * * * *